United States Patent
Gu

(10) Patent No.: US 8,593,972 B2
(45) Date of Patent: Nov. 26, 2013

(54) METHOD TO VERIFY A DROP PROBABILITY CURVE

(75) Inventor: Yu Gu, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 237 days.

(21) Appl. No.: 13/248,181

(22) Filed: Sep. 29, 2011

(65) Prior Publication Data

US 2013/0083657 A1   Apr. 4, 2013

(51) Int. Cl.
  *H04J 1/06* (2006.01)
  *H04L 12/28* (2006.01)
(52) U.S. Cl.
  USPC .......................................... 370/241
(58) Field of Classification Search
  USPC .......... 370/230, 235, 236, 241, 252, 400, 412
  See application file for complete search history.

(56) References Cited

U.S. PATENT DOCUMENTS

| | | | |
|---|---|---|---|
| 6,314,085 B1 * | 11/2001 | Saranka | 370/230 |
| 6,813,243 B1 | 11/2004 | Epps et al. | |
| 6,888,824 B1 | 5/2005 | Fang et al. | |
| 7,035,216 B2 * | 4/2006 | Kikuchi et al. | 370/235 |
| 7,139,281 B1 * | 11/2006 | Bodin | 370/412 |
| 7,142,507 B1 * | 11/2006 | Kurimoto et al. | 370/229 |
| 7,149,187 B1 | 12/2006 | Jacobson | |
| 7,218,608 B1 | 5/2007 | Fang | |
| 7,349,419 B1 * | 3/2008 | Philp | 370/414 |
| 7,554,907 B1 | 6/2009 | Epps et al. | |
| 7,852,866 B2 * | 12/2010 | Chao et al. | 370/412 |
| 8,170,045 B2 * | 5/2012 | Pan et al. | 370/429 |
| 2003/0095551 A1 * | 5/2003 | Gotoh et al. | 370/395.3 |
| 2007/0091802 A1 * | 4/2007 | Pan et al. | 370/230 |
| 2008/0043745 A1 * | 2/2008 | Toomey et al. | 370/395.21 |
| 2011/0091785 A1 * | 4/2011 | Miyazawa | 429/465 |
| 2011/0194426 A1 * | 8/2011 | Fang et al. | 370/252 |

OTHER PUBLICATIONS

Blake, S., Request for Comments (RFC) 2475, "An Architecture for Differentiated Services," Dec. 1998, 36 pages.
Floyd, Sally et al., "Random Early Detection Gateways for Congestion Avoidance," 1993, 22 pages.

* cited by examiner

*Primary Examiner* — Andrew Lee
(74) *Attorney, Agent, or Firm* — Novak Druce Connolly Bove + Quigg LLP

(57) ABSTRACT

In one embodiment, a test technique verifies a drop probability curve implemented by an intermediate node of a computer network, wherein a test point of the drop probability curve has a drop probability value and a queue length value. Traffic may be loaded into a queue of the node at a constant bit rate that is based on the drop probability value and an output rate associated with queue. An average traffic latency may then be measured, and an actual queue length may be calculated by multiplying the measured average traffic latency with the output rate. The drop probability curve may be verified when the calculated queue length is within a specified tolerance of the queue length value associated with the test point.

20 Claims, 5 Drawing Sheets

US 8,593,972 B2

METHOD TO VERIFY A DROP PROBABILITY CURVE

TECHNICAL FIELD

The present disclosure relates generally to computer networks and, more particularly, to verifying a drop probability curve implemented by an intermediate node of a computer network.

BACKGROUND

Random Early Detection/Drop/Discard (RED) is an important Quality of Service (QoS) feature that may be implemented on an intermediate node, such as a router, and utilized by network service providers for traffic congestion avoidance in a computer network. Typically, communication links of the network couple to the router via input and output ports that, in turn, connect to one or more buffers or queues (e.g., queuing logic) of the router. Depending upon the bandwidths of the links, traffic, e.g., packets, received at the input ports may "burst-up" and overflow at a queue as they wait to be transmitted over the output ports, thus causing congestion in the network. A RED algorithm implementation on the router uses direct measurement of a queue length to randomly drop packets to avoid such congestion. However, there is no known effective way to objectively evaluate compliance of the RED implementation on the router.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
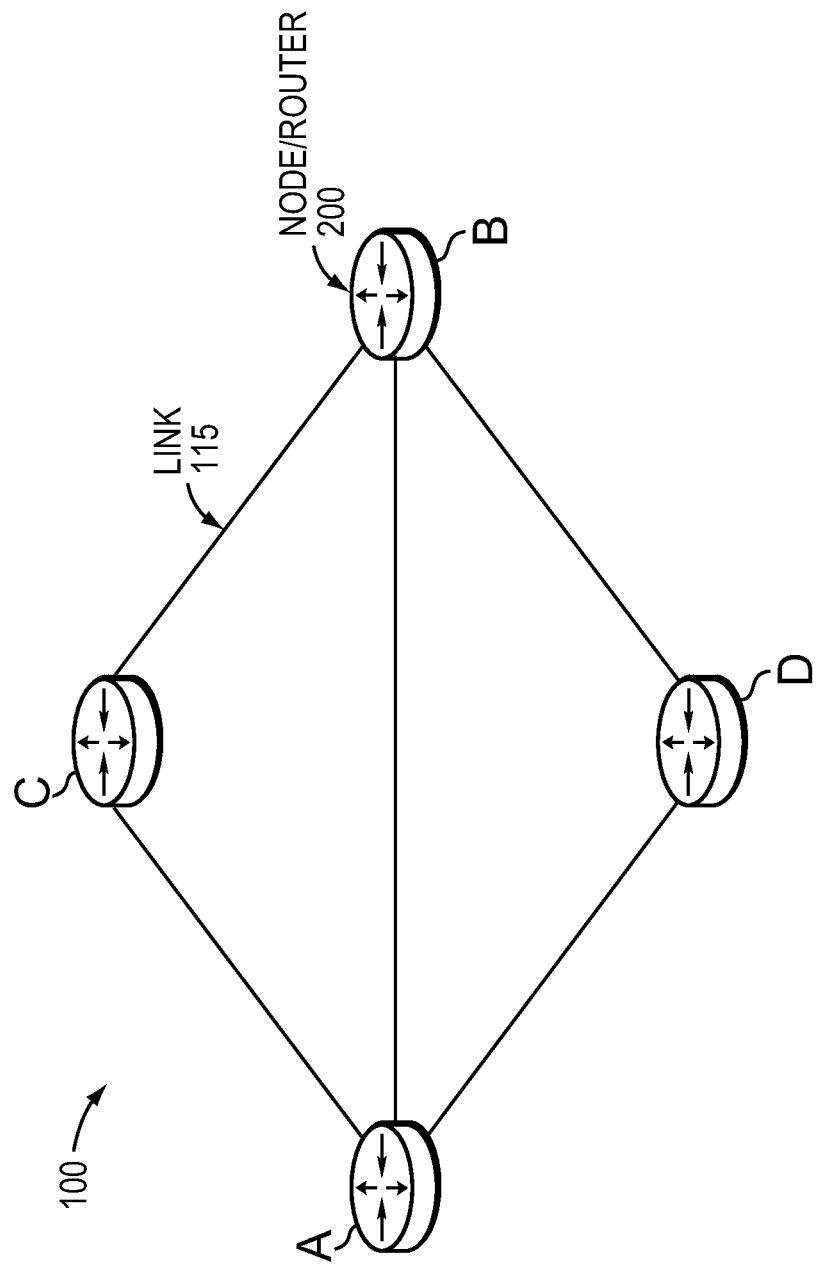
FIG. 1 illustrates an example computer network.

According to one or more embodiments of the disclosure, a test technique may verify compliance of a random early detection/drop/discard (RED) implementation used to avoid traffic congestion in a computer network caused by overflow of packet traffic at a queue of an intermediate node, such as a router. The RED implementation may be graphically represented as a drop probability curve that dictates packet drop probability according to a length of the queue. Compliance of the RED implementation may be verified in accordance with the test technique by measuring correlation between drop probability and queue length at any test point of the curve using external test equipment that supports traffic latency measurements. Accordingly, the test technique provides an effective way to quantitatively verify the drop probability curve and, thus, objectively evaluate compliance of the RED implementation of the router.

In an illustrative embodiment, each test point of the drop probability curve has two values: a drop probability value ("A") and a queue length value ("B"), wherein the drop probability value A represents a percentage of packets that may be randomly dropped, e.g., at a tail end of the queue by a traffic policer of the router, when a specific queue length value B of the queue is reached. The test technique may verify that for a drop probability value A associated with a chosen test point of the drop probability curve, a calculated queue length is within a specified tolerance of queue length value B (i.e., an expected queue length) associated with the chosen test point.

To verify the chosen test point of the drop probability curve, a traffic generator may input packets to the queue at a constant bit rate of Y, wherein $Y=X/(1-A)$, X is illustratively a value representing a bit rate of the packets output from the queue, and A is illustratively a value between 0 and 1. After setting the input rate Y, an average traffic latency ("L") may be measured utilizing a traffic analyzer, wherein L is illustratively a value representing the average latency incurred by a packet to traverse the queue. An actual queue length ("Q") may then be calculated by multiplying the measured average traffic latency L with the bit rate X. If the calculated queue length Q is within a specified tolerance of the expected queue length value B, the chosen test point of the drop probability curve may be verified and the RED implementation of the router may be evaluated as compliant.

Description

A computer network includes a plurality of communication links and segments connected to a plurality of nodes, such as end nodes and intermediate nodes. The communication links and segments may include local area networks (LANs) and wide area networks (WANs) interconnected by the intermediate nodes, such as switches and routers, to form an internetwork of nodes. The internetworked nodes illustratively communicate over the network by exchanging discrete frames or packets of information according to predefined protocols, such as the Transmission Control Protocol/Internet Protocol (TCP/IP). In this context, a protocol consists of a set of rules defining how the nodes interact with each other.

FIG. 1 illustrates an example computer network 100 illustratively comprising an internetwork of nodes, such as intermediate nodes 200 (e.g., routers A-D) interconnected by communication links 115. Those skilled in the art will understand that any number of nodes, devices and/or links may be used in the computer network, and that the view shown herein is for simplicity. Those skilled in the art will also understand that while the embodiments described herein are described generally, they may apply to any network configuration of communication links interconnected by intermediate nodes.

Figure 2:
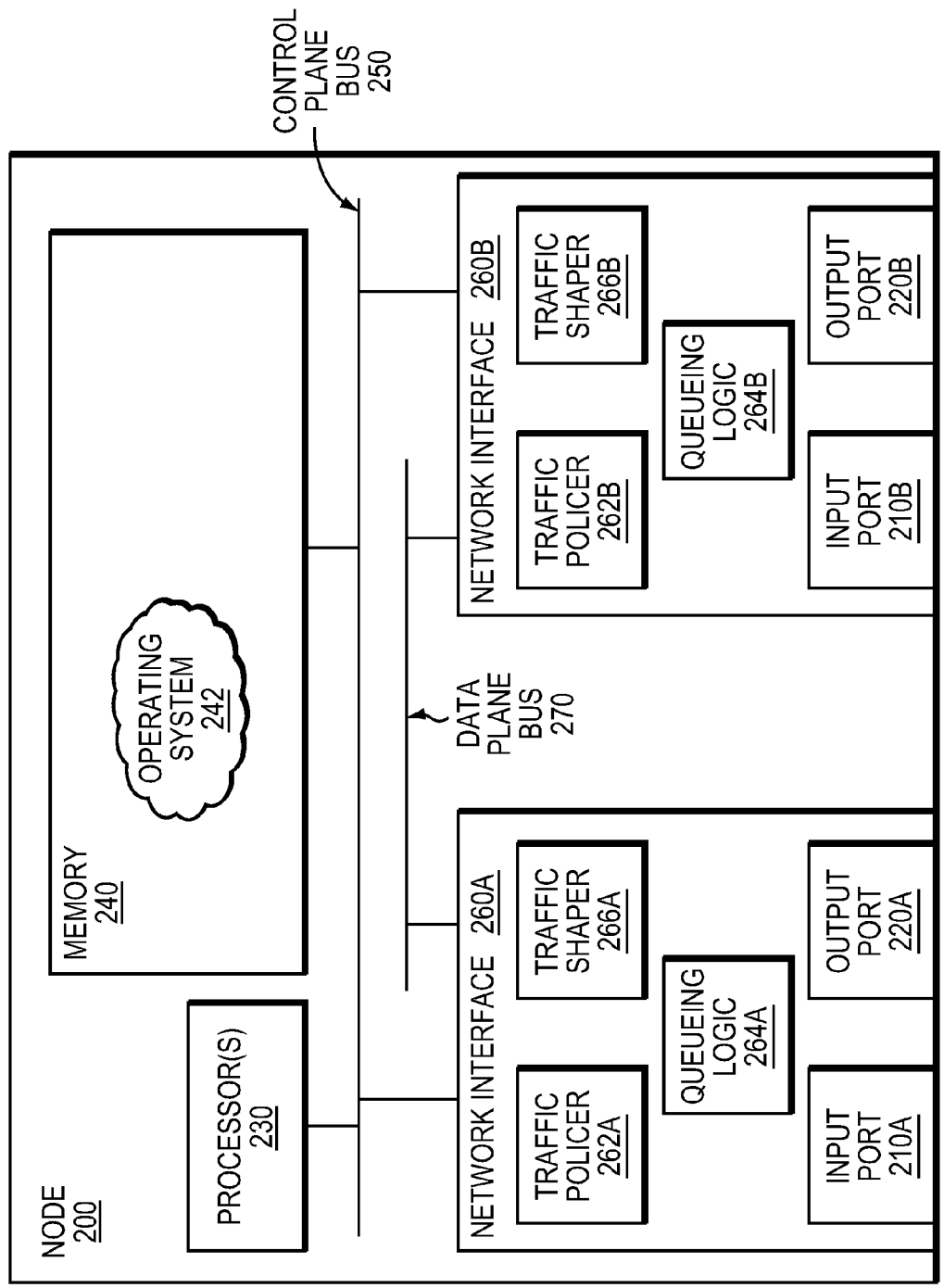
FIG. 2 illustrates an example intermediate node.

FIG. 2 illustrates an example intermediate node 200 that may be used with one or more embodiments described herein. The intermediate node is illustratively a router comprising a plurality of network interfaces 260 (e.g., 260A and 260B), one or more processors 230, and a memory 240 interconnected by a plurality of buses, e.g., a control plane bus 250 and a data plane bus 270. The network interfaces 260 may include, inter alia, an input port 210 (e.g., 210A and 210B) and an output port 220 (e.g., 220A and 220B) containing the mechanical, electrical, and signaling circuitry for communicating data over physical links coupled to the network 100. The ports may be configured to transmit and/or receive data using a variety of different communication protocols, including, inter alia, TCP/IP, UDP, ATM, synchronous optical networks (SONET), wireless protocols, Frame Relay, Ethernet, Fiber Distributed Data Interface (FDDI), etc.

The network interfaces may further include a traffic policer 262 (e.g., 262A and 262B), queuing logic 264 (e.g., 264A and 264B), and a traffic shaper 266 (e.g., 266A and 266B). Queuing logic 264 may comprise a plurality of queues and logic circuitry configured to organize queuing operations needed to maintain sequencing of packets (traffic), accommodate latency between various I/O data rates of the interfaces and provide quality of service (QoS) features. Traffic policer 262 illustratively contains circuitry configured to ensure that the traffic received from (or transmitted to) the network complies with one or more relevant traffic specifiers. A traffic specifier may guarantee a level of service, e.g., a specified bit rate, for the traffic, and/or place limits on the amount of resources consumed by the traffic. Traffic shaper 266 illustratively contains circuitry to smooth the transmission of traffic output from a queue to the specified bit rate. Traffic that conforms to the specifier may be transmitted without alteration, while traffic that exceeds the specifier (i.e., traffic that is "out-of-profile") may be policed (i.e., dropped) or shaped (i.e., held until the traffic returns to its specified rate). Advantageously, traffic flow may be regulated in order to avoid network congestion. Traffic policing and traffic shaping are well-known and described in more detail in Request for Comments (RFC) 2475, entitled "An Architecture for Differentiated Services," dated December 1998.

The memory 240 comprises a plurality of locations that are addressable by the processor(s) 230 and the network interfaces 260 for storing software programs and data structures associated with the embodiments described herein. The processor 220 may comprise necessary elements or logic adapted to execute the software programs and manipulate the data structures. An operating system 242 (e.g., the Internetworking Operating System, or IOS®, of Cisco Systems, Inc.), portions of which are typically resident in memory 240 and executed by the processor(s), functionally organizes the node by, inter alia, invoking network operations in support of software processes and/or services executing on the node. It will be apparent to those skilled in the art that other types of processors and memory, including various computer-readable media, may be used to store and execute program instructions pertaining to the techniques described herein. Also, while the embodiments herein are described in terms of processes or services stored in memory, alternative embodiments also include the processes described herein being embodied as modules consisting of hardware, software, firmware, or combinations thereof.

As noted, Random Early Detection/Drop/Discard (RED) is an important QoS feature that is implemented on an intermediate node, such as a router, and utilized by network service providers for traffic congestion avoidance in a network. RED is well-known and described in more detail in "Random Early Detection Gateways for Congestion Avoidance," by Sally Floyd and Van Jacobson, dated 1993 and U.S. Pat. No. 6,888,824, issued May 3, 2005, entitled Random Early Detection (RED) Algorithm Using Marked Segments to Detect Congestion in a Computer Network, by Chien Fang, et al., and assigned to Cisco Technology Inc. Typically, communication links of the network couple to the router via input and output ports that, in turn, connect to one or more buffers or queues (e.g., queuing logic) of the router. Depending upon the bandwidths of the links, traffic, e.g., packets, received at the input ports may "burst-up" and overflow at a queue as they wait to be transmitted over the output ports, thus causing congestion in the network. A RED algorithm implementation on the router uses direct measurement of a queue length to randomly drop packets to avoid such congestion. However, there is no known effective way to objectively evaluate compliance of the RED implementation on the router.

Drop Probability Curve Verification

According to one or more embodiments of the disclosure, a test technique may verify compliance of a RED implementation used to avoid traffic congestion in a computer network caused by overflow of packet traffic at a queue of an intermediate node, such as a router. The RED implementation may be graphically represented as a drop probability curve that dictates packet drop probability according to length of the queue. Compliance of the RED implementation may be verified in accordance with the test technique by measuring correlation between drop probability and a queue length at any test point of the drop probability curve using external test equipment that supports traffic latency measurements. Accordingly, the test technique provides an effective way to quantitatively verify the drop probability curve and, thus, objectively evaluate compliance of the RED implementation of the router.

Figure 3:
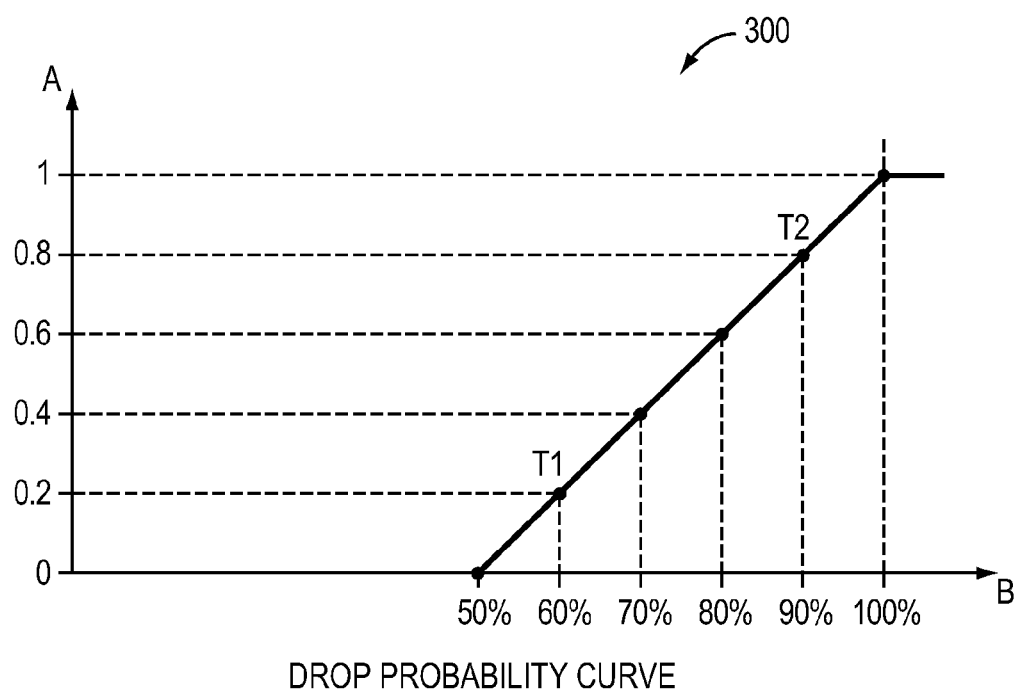
FIG. 3 illustrates an example drop probability curve.

FIG. 3 illustrates an example drop probability curve 300 that may be used with one or more embodiments described herein. The drop probability curve 300 has a plurality of test points, where each test point illustratively has two values: a drop probability value ("A") represented by the Y axis and a queue length value ("B") represented by the X axis. The drop probability value A represents a percentage of packets that may be randomly dropped when a specific queue length value B is reached. For example, and with reference to test point T1 of drop probability curve 300, when a queue length reaches 60%, e.g., 60% of the queue is occupied with traffic, 20% (corresponding to a drop probability value of 0.2) of the packets are randomly dropped. However, with reference to test point T2, when the queue length reaches 90%, e.g., 90% of the queue is occupied with traffic, 80% (corresponding to a drop probability value of 0.8) of the packets are randomly dropped. It should be noted that the drop probability curve 300 and its associated test points and values are simply exemplary in nature, and any drop probability curve and associated test points and values may be used. It should be further noted that the drop probability curve may be based on statistical probabilities of the RED algorithm as described in more detail in "Random Early Detection Gateways for Congestion Avoidance," by Sally Floyd and Van Jacobson, dated 1993.

The test technique described herein may verify that for a drop probability value A associated with a chosen test point of the drop probability curve, a calculated queue length is within a specified tolerance of queue length value B (i.e., an expected queue length) associated with the test point. To verify the chosen test point of the drop probability curve, packets may be loaded into the queue at a constant bit rate of Y, wherein $Y=X/(1-A)$, X is illustratively a value representing a bit rate of the packets output from the queue, and A is illustratively a value between 0 and 1. After setting the input bit rate Y, an average traffic latency ("L") may be measured, wherein L is illustratively a value representing the average latency incurred by a packet to traverse the queue. An actual queue length ("Q") may then be calculated by multiplying the measured average traffic latency L with the bit rate X. If the calculated queue length Q is within a specified tolerance of the expected queue length value B, the chosen test point of the drop probability curve may be verified and the RED implementation of the router may be evaluated as compliant.

Figure 4:
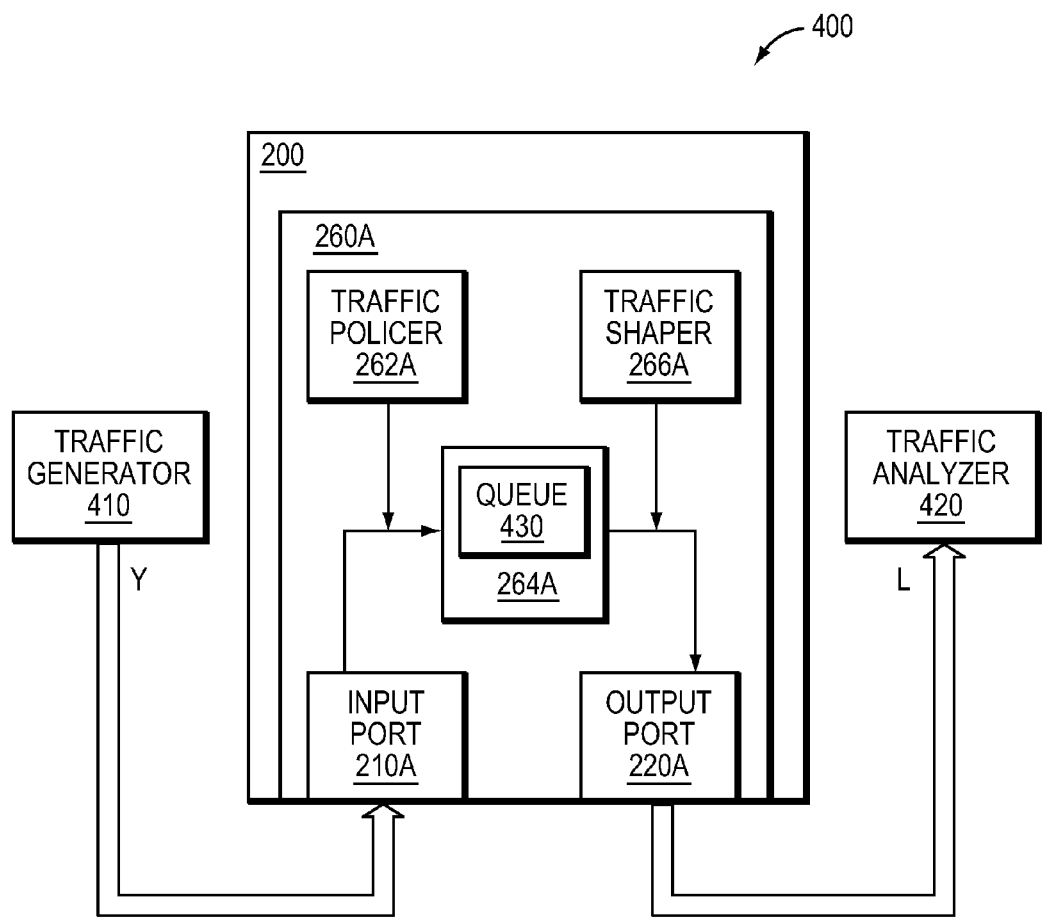
FIG. 4 illustrates an example testing environment to verify a drop probability curve implemented by the intermediate node.

FIG. 4 illustrates an example testing environment 400 that may be configured to verify a drop probability curve used with one or more embodiments described herein. Testing environment 400 may include node 200, a traffic generator 410, and a traffic analyzer 420. For purposes of explanation and depiction, node 200 has been shown with only network interface 260A and the components contained therein (e.g., traffic policer 262A, a queue 430 of queuing logic 264A, and traffic shaper 266A). The traffic generator 410 may be coupled to node 200 via input port 210A and configured to load (input) packets into the queue 430 of queuing logic 264 at a constant bit rate Y that may be selected by a user, for example. Further, traffic analyzer 420 may be coupled to node 200 via output port 220A and configured to measure an average traffic latency L, wherein L is illustratively a value representing the average latency (e.g., time) incurred by a packet to traverse the queue 430.

According to one or more embodiments described herein, test point T1 on the drop probability curve 300 may be verified utilizing the testing environment 400. Specifically, test point T1 has a drop probability value A of 0.2 (20%) and a queue length value B of 60%. Thus, if we assume that the maximum queue length is configured to 1 megabit, when 60% of the queue is occupied with traffic (.e.g., 0.6 megabits), 20% percent of the packets should be randomly dropped (e.g., at a tail end of the queue). To verify test point T1 and compliance of the RED implementation at node 200, the traffic generator 410 may first load (input) packets into the queue 430 of queuing logic 264 of node 200 (e.g., via input port 210A) at a constant bit rate Y. Specifically, Y is based on a drop probability value A of test point T1 and output bit rate X, wherein $Y=X/(1-A)$. In this example, assume that X is 0.7 megabits/second. Thus, Y equals 0.875 megabits/second (e.g., 0.7/(1-0.2)) for test point T1, and the traffic generator loads traffic into the queue at a constant rate of 0.875 megabits/second. Therefore, as Y increases and exceeds the value of X, packets enter the queue at a rate that is faster than that at which they exit the queue. Thus, as the queue "fills up" (e.g., B increases), the drop probability (e.g., A) increases and packets are randomly dropped at an increasingly higher percentage.

After setting the input rate Y to 0.875 megabits/second at the traffic generator, an average traffic latency L may be measured utilizing traffic analyzer 420 that is coupled to is output port 220A, wherein L is illustratively a value representing the average latency incurred by packets traversing the queue 430. It is noted that, as Y increases and the queue fills up (e.g., B increases), the average traffic latency L also increases. For this example, assume that the average traffic latency L measured at traffic analyzer 420 is 0.85714 seconds, meaning that it takes an average of 0.85714 seconds for packets to traverse the queue. The measured average traffic latency L may then be multiplied by the bit rate X to calculate the actual queue length Q. Here, the actual queue length Q is calculated by multiplying 0.85714 seconds (L) with 0.7 megabits/second (X), which equals 0.59999 megabits. Assume that in this example the specified tolerance is +/−0.001 megabits. To verify test point T1 and compliance of the RED implementation at node 200, the calculated queue length Q must be within the specified tolerance (+/−0.001) of the expected queue length value B of test point T1. Thus, since the calculated queue length Q of 0.59999 megabits is within the specified tolerance (+/−0.001) of the expected queue length value B of 0.6 megabits (i.e., 60% of the queue, which is configured to have maximum queue length of 1 megabit, is occupied with traffic), it may be concluded that node 200 is in compliance with the drop probability curve 300.

Assume also that the average traffic latency L is measured as 0.2345 seconds. Therefore, in this example, the actual queue length Q is calculated by multiplying 0.2345 seconds (L) with 0.7 megabits/second (X), which equals 0.16415 megabits. Thus, since the measured queue length Q of 0.16415 megabits is not within the specified tolerance (+/− 0.001) of the expected queue length value B of 0.6 megabits, it may be concluded that node 200 is not in compliance with the drop probability curve 300.

Figure 5:
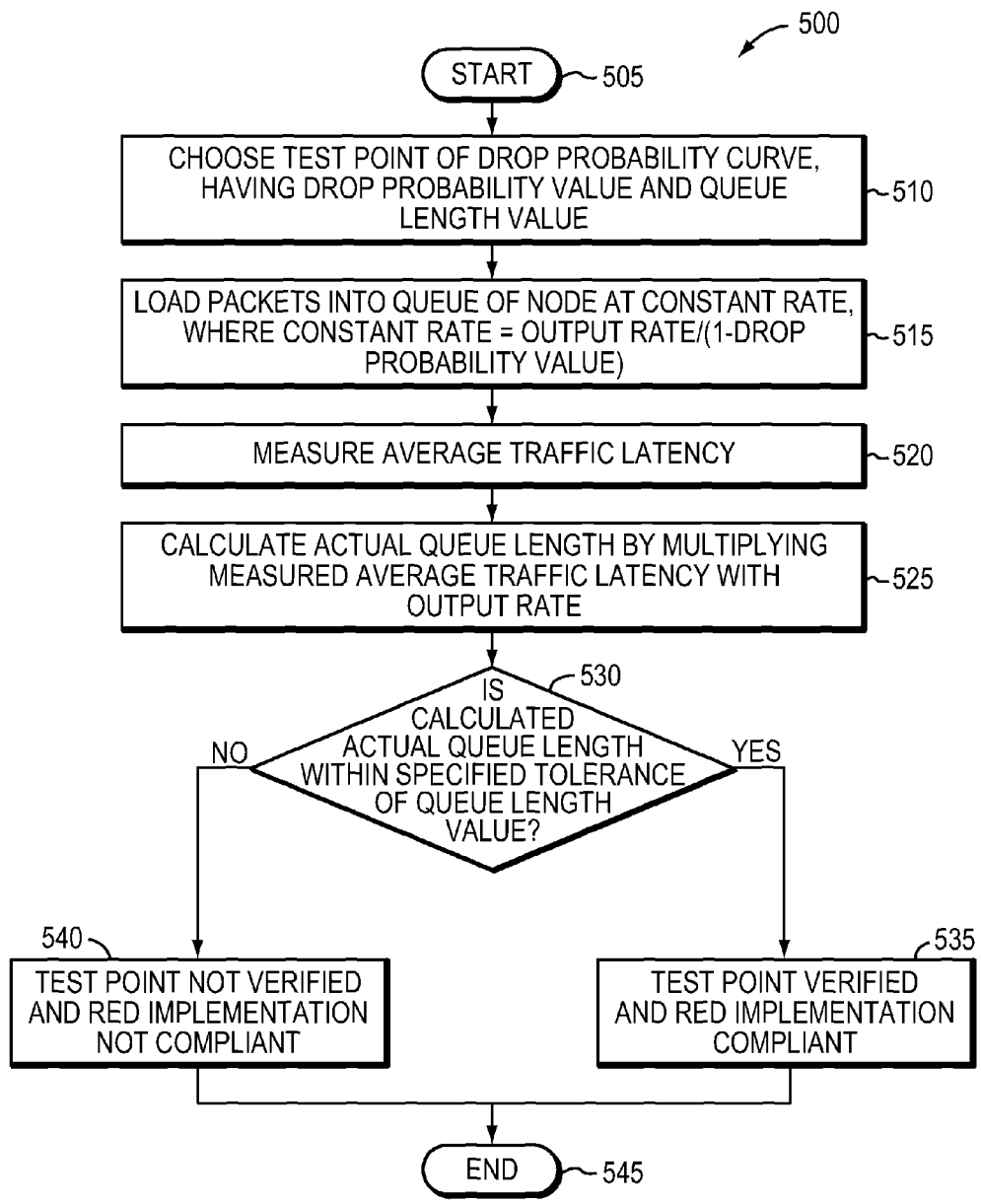
FIG. 5 illustrates an example simplified procedure for verifying a drop probability curve implemented by the intermediate node.

FIG. 5 illustrates an example procedure for verifying a drop probability curve implemented by an intermediate node in accordance with one or more embodiments described herein. The procedure 500 starts at step 505 and continues to step 510 where a test point of the drop probability curve is chosen, wherein the test point is associated with a drop probability value A and a queue length value B. In step 515, packets are loaded into a queue of the node at a constant bit rate of Y, wherein $Y=X/(1-A)$, X represents a bit rate of packets output from the queue and A is a value between 0 and 1 (and associated with the chosen test point). In step 520, an average latency L may be measured, wherein L is illustratively a value representing the average latency incurred by packets traversing the queue. At step 525, an actual queue length Q may be calculated by multiplying the measured average traffic latency L with the bit rate X. At step 530, a determination is made as to whether the calculated actual queue length Q is within a specified tolerance of the expected queue length value B associated with the chosen test point. At step 535, if the calculated actual queue length Q is within the specified tolerance of the expected queue length B, the test point of the drop probability curve is verified and the RED implementation by the node may be evaluated as compliant. However, if the calculated actual queue length Q is not within a specified tolerance of the expected queue length B (step 540), the test point of the drop probability curve is not verified and the RED implementation by the node may not be evaluated as compliant. The procedure then ends at step 545.

While the illustrative embodiments herein have described an apparatus of a testing environment for verifying a drop probability curve implemented at an intermediate node of a computer network, it is to be understood that various other adaptations and modifications may be made within the spirit and scope of the embodiments disclosed herein. For example, it is expressly contemplated that the components and/or elements described herein can be implemented as software encoded on one or more tangible (non-transitory) computer-readable storage media (e.g., disks/CDs/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   loading packets into a queue of a node comprising a processor and a memory, the packets loaded at a constant input rate that is based on a drop probability value associated with a chosen test point of a drop probability curve and an output rate associated with the node;
   measuring an average latency incurred by the packets traversing the queue;
   calculating an actual queue length of the queue based on the measured average latency and the output rate; and
   determining that the node complies with the drop probability curve when the calculated actual queue length is within a tolerance value of a queue length value associated with the chosen test point of the drop probability curve.

2. The method of claim 1, further comprising determining that the node does not comply with the drop probability curve when the calculated actual queue length is not within the tolerance value of the queue length value associated with the chosen test point of the drop probability curve.

3. The method of claim 1, wherein the drop probability curve is associated with a random early detection implementation of the node.

4. The method of claim 1, wherein the drop probability value associated with the chosen test point of the drop probability curve represents a percentage of packets randomly dropped when the queue reaches the queue length value associated with the chosen test point of the drop probability curve.

5. The method of claim 4, wherein the percentage of packets are randomly dropped at a tail end of the queue by a traffic policer.

6. The method of claim 1, wherein the constant input rate=Y, the output rate=X, and the drop probability value=A between 0 and 1, and wherein Y=X/(1−A).

7. The method of claim 1, wherein the output rate represents a bit rate of the packets output from the queue by a traffic shaper.

8. The method of claim 1, wherein the actual queue length is calculated by multiplying the measured average latency with the output rate.

9. An apparatus, comprising:
a generator configured to load packets into a queue of an intermediate node coupled to a computer network, the packets loaded at a constant input rate that is based on a drop probability value associated with a chosen test point of a drop probability curve and a shaped output rate; and
an analyzer configured to measure an average latency incurred by the packets traversing the queue,
wherein an actual queue length is calculated based on the measured average latency and the shaped output rate, and wherein the intermediate node complies with the probability curve when the calculated actual queue length is within a tolerance value of a queue length value associated with the chosen test point of the drop probability curve.

10. The apparatus of claim 9, wherein the intermediate node does not comply with the probability curve when the calculated actual queue length is not within the tolerance value of the queue length value associated with the chosen test point of the drop probability curve.

11. The apparatus of claim 9, wherein the drop probability curve is associated with random early detection implementation of the intermediate node.

12. The apparatus of claim 9, wherein the drop probability value associated with the chosen test point of the drop probability curve represents a percentage of packets randomly dropped by a traffic policer of the intermediate node when the queue reaches the queue length value associated with the chosen test point of the drop probability curve.

13. The apparatus of claim 12, wherein the percentage of packets are randomly dropped at a tail end of the queue by the traffic policer.

14. The apparatus of claim 9, wherein the constant rate=Y, the shaped output rate=X, and the drop probability value=A between 0 and 1, and wherein Y=X/(1−A).

15. The apparatus of claim 9, wherein the shaped output rate represents a bit rate of the packets output from the queue by a traffic shaper.

16. The apparatus of claim 9, wherein the actual queue length is calculated by multiplying the measured average latency with the shaped output rate.

17. A system comprising, comprising:
means for loading packets into a queue of a node comprising a processor and a memory, the packets loaded at a constant input rate that is based on a drop probability value associated with a chosen test point of a drop probability curve and an output rate associated with the node; and
means for measuring an average latency incurred by the packets traversing the queue,
wherein an actual queue length is calculated based on the measured average latency and the output rate, and wherein the node complies with the probability curve when the calculated actual queue length is within a tolerance value of the queue length value associated with the chosen test point of the drop probability curve.

18. The system of claim 17, wherein the node does not comply with the probability curve when the calculated actual queue length is not within the tolerance value of the queue length value associated with the chosen test point of the drop probability curve.

19. The method of claim 17, wherein the constant rate=Y, the output rate=X, and the drop probability value=A between 0 and 1, and wherein Y=X/(1−A).

20. The method of claim 17, wherein the actual queue length is calculated by multiplying the measured average latency with the output rate.

\* \* \* \* \*